United States Patent
Gallo et al.

(10) Patent No.: US 6,700,883 B1
(45) Date of Patent: Mar. 2, 2004

(54) ALGORITHM TO BYPASS L4 PROCESSING IN AN INTERNET PROTOCOL FORWARDING PROCESSOR

(75) Inventors: Anthony Matteo Gallo, Apex, NC (US); Brahmanand Kumar Gorti, Cary, NC (US); Donald Newland Jones, Apex, NC (US); Natarajan Vaidhyanathan, Durham, NC (US); Colin Beaton Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/543,145

(22) Filed: Apr. 5, 2000

(51) Int. Cl.$^7$ .................. H04L 12/56; G06F 15/173
(52) U.S. Cl. ...................... 370/351; 709/238
(58) Field of Search .................. 370/254, 255, 370/351, 355, 347, 395, 331, 410, 401; 709/236, 230, 238, 200, 242, 250

(56) References Cited

U.S. PATENT DOCUMENTS

| | | | |
|---|---|---|---|
| 6,343,326 B2 * | 1/2002 | Acharya et al. | 709/238 |
| 6,549,521 B1 * | 4/2003 | Edwards et al. | 370/255 |
| 6,600,744 B1 * | 7/2003 | Carr et al. | 370/392 |

* cited by examiner

Primary Examiner—Wellington Chin
Assistant Examiner—William Schultz

(74) Attorney, Agent, or Firm—C. Lamont Whitham

(57) ABSTRACT

A controllable mechanism for by-passing Layer 4 (L4) classification is based on the insertion into a set of Layer 3 (L3) rules in an L3 lookup tree set of Layer 4 (L4) Classification Required Flags. The state of the L4 classification flag is set by comparing the L4 classification rule to an IP (Internet Protocol) lookup rule. Routing is accomplished by selecting which rule to apply to the data packet and reading the state of the corresponding L4 Classification Required Flag. In response to a first state of the corresponding L4 Classification Required Flag, an L4 classification is performed followed by a routing of the data packet. In response to a second state of the corresponding L4 Classification Required Flag performing a routing of said data packet. In a second embodiment, the method inserts into a set of L3 rules in L3 lookup means a set L4 Classification Required Flags and Global Flags. A first state of the L4 Classification Required Flag is set when a new rule is added to L4 classification means, the new rule being correlatable to a single entry in L3 lookup means. Routing is accomplished by selecting which rule to apply to the data packet and reading the state of the corresponding L4 classification required flag. In response to a first state of the corresponding L4 classification flag, a L4 classification is performed followed by a routing of the data packet. In response to a second state of the corresponding L4 classification flag, the state of the Global Flag is read, and in response to a first state of the Global flag, a L4 classification is performed followed by a routing of the data packet. In response to a second state of the Global Flag, the data packet is routed.

4 Claims, 6 Drawing Sheets

US 6,700,883 B1

ALGORITHM TO BYPASS L4 PROCESSING IN AN INTERNET PROTOCOL FORWARDING PROCESSOR

BACKGROUND OF THE INVENTION

1. Field of the Invention

The present invention generally relates to routing of packets in a computer network and, more particularly, to a controllable mechanism for by-passing Layer 4 (L4) classification.

2. Background Description

The problem of the design of computer networks is partitioned into smaller subtasks, by dividing the problem into layers. The OSI (Open Systems Interconnection) reference model defines seven layers. This invention is primarily concerned with the protocols of Layer 3, the network layer, and Layer 4, the transport layer. Each layer communicates with its peer layer in another node in the network through the use of a protocol. A multicast address is intended to be destined to a group of nodes, as opposed to a unicast address which is destined for a single node in the network.

The general purpose of packet classification in a switch, is to classify (or identify) packets arriving from a network interface. Actions can be associated with classification rules so that the actions can be applied to matching packets. Furthermore, it is the intention of this design to support this level of packet classification, and to apply the associated actions to the packets at "wire speed".

The Classifier Tree itself is at the core of the Classifier. The tree contains packet-handling rules. Each rule defines what to do with a packet (action) when it matches the criteria specified in the rule (description). Only certain bits (or fields) in a packet are of interest to an individual tree which is inherent to the tree definition. (Individual trees, of course, may be interested in different fields.) Both the tree creator and searcher must agree on which fields define the rules in any given tree. The creator and searcher may execute on different processors, but there must be agreement between the two on how the tree is defined.

Rules are added to the tree by applications. Applications typically (but not always) are tasked with performing one type of action on packets. As long as different applications (e.g., Network Dispatcher, Layer 3 (L3) filtering, Quality of Service (QoS)) are interested in the same packet fields, they can contribute rules to the same trees. In other words, multiple action types are supported in the same tree as long as the contributors agree on what fields in the packet are of interest. Multiple Classifier trees may be supported on the same system. Applications may decide more than one Classifier tree is needed because (for example):

Applications are interested in different fields. It may not be practical for IP (Internet Protocol) and IPX (Internet Packet Exchange) filter rules to share the same table.

Search applications may be interested in only a subset of rules at a particular time. Perhaps one set of actions is relevant to packets as they are received and yet another set of actions is relevant when transmitting packets. Received actions could be placed in one tree, and transmit actions could be placed in another tree.

Normal processing flow, which includes Layer 4 (L4) classification, is slow, especially if the classifier is a Software Managed Tree (SMT) or includes an SMT component.

SUMMARY OF THE INVENTION

It is therefore an object of the present invention to provide a controllable mechanism for by-passing Layer 4 (L4) classification.

According to a first embodiment of the invention, there is provided a method of routing a data packet which based on the insertion into a set of Layer 3 (L3) rules in an L3 lookup tree set of Layer 4 (L4) Classification Required Flags. The state of the L4 classification flag is set by comparing the L4 classification rule to an IP (Internet Protocol) lookup rule. Routing is accomplished by selecting which rule to apply to the data packet and reading the state of the corresponding L4 Classification Required Flag. In response to a first state of the corresponding L4 Classification Required Flag, an L4 classification is performed followed by a routing of the data packet. In response to a second state of the corresponding L4 Classification Required Flag performing a routing of said data packet.

According to a second embodiment of the invention, the method inserts into a set of L3 rules in L3 lookup means a set of L4 Classification Required Flags, and a Global Flag is inserted into memory. A first state of the L4 Classification Required Flag is set when a new rule is added to L4 classification means, the new rule being correlatable to a single entry in L3 lookup means. Routing is accomplished by selecting which rule to apply to the data packet and reading the state of the corresponding L4 classification required flag. In response to a first state of the corresponding L4 classification flag, a L4 classification is performed followed by a routing of the data packet. In response to a second state of the corresponding L4 classification flag, the state of the Global Flag is read, and in response to a first state of the Global flag, a L4 classification is performed followed by a routing of the data packet. In response to a second state of the Global Flag, the data packet is routed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
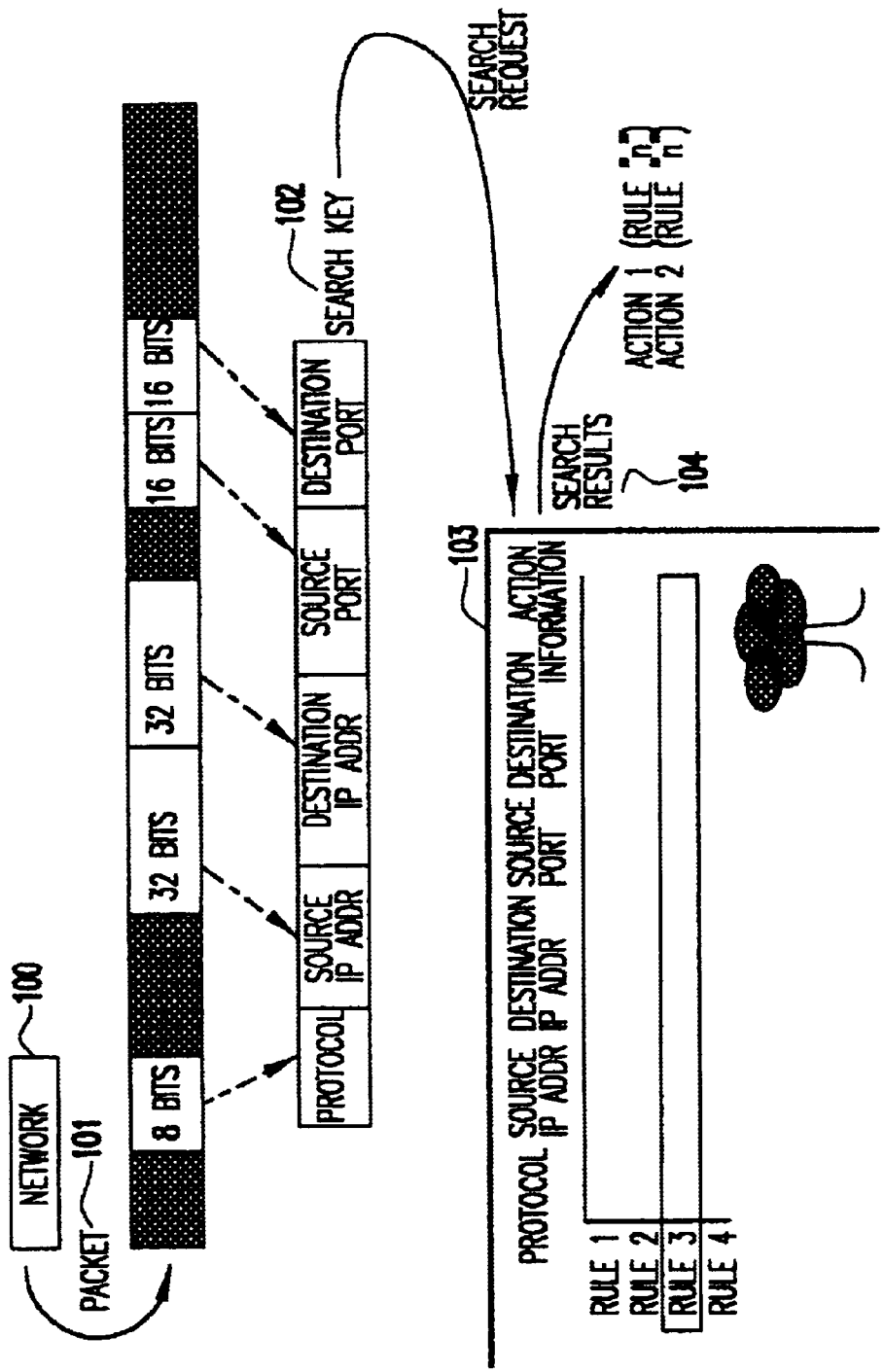
FIG. 1 is data flow diagram illustrating one sub-procedure of a frame routing procedure performed in an Internet protocol (IP) forwarding processor.

Referring now to the drawings, and more particularly to FIG. 1, there is shown an illustration of the use of a Classifier tree. A packet 101 arrives from network 100. A search key 102 is constructed from packet data (based on which tree you want to search since the tree definition defines which fields need to be included in the key). A search is made the tree 103 using the key. Notice that it may help to think of the Classifier rule "tree" as a "table of rules". The search produces action(s) 104 that must be applied to the packet.

Figure 2:
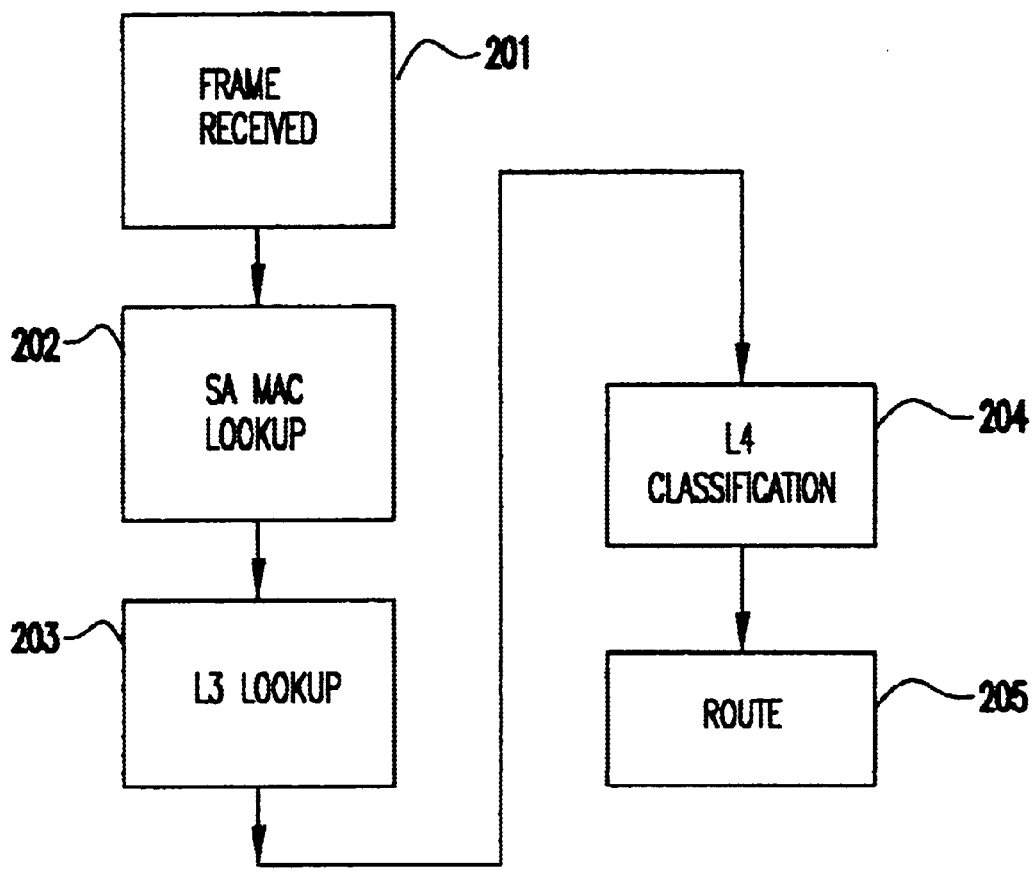
FIG. 2 is a flowchart illustrating one method of frame routing.

The above L4 classification sequence is one sub-procedure of a frame routing procedure performed in an Internet protocol forwarding processor. FIG. 2 is a flowchart illustrating one method of frame routing practiced today. A frame is received in function block 201. First, a Source Address (SA) Media Access Control (MAC) lookup is done in function block 202, then an L3 lookup in function block 203, then an L4 classification in function block 204, and finally the frame is routed in function block 205.

The present invention is a method for invoking L4 Internet Protocol (IP) processing and L4 IPX processing in a L3 switching environment using Network Processors (NP) to improve performance. Several mechanisms are provided which may be switched on and off.

Key to the invention is the creation and use of two flags. The first flag is an L4 Classification Required Flag in the leaf(s)of the L3 IP routing tree. The second flag is a Global Classification Flag and is set in memory. The user creates these flags. The invention comprises two embodiments. The first uses only the L4 Classification Required Flag. The second utilizes both the L4 Classification Required Flag and the Global Flag.

Figure 3A:
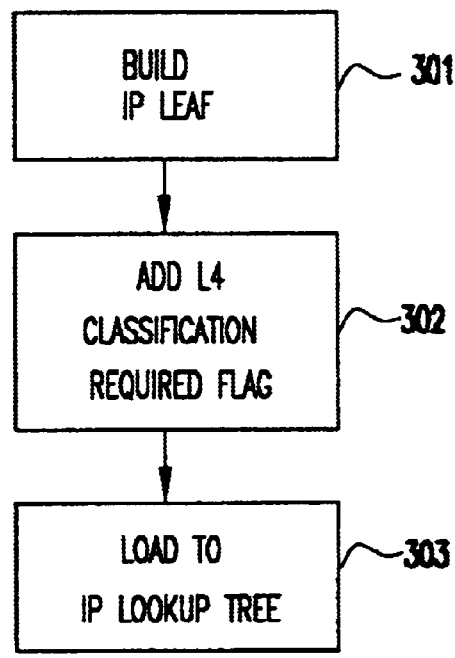
FIG. 3A is a flowchart showing the procedure for a first new flag, called the Classification Required Flag, according to the invention.

FIG. 3A illustrates the setting of Classification Required Flag. For the L4 Classification Required Flag, the IP leaf is built in function block 301. Then, the L4 Classification Required Flag is added to the leaf in function block 302. Finally, the leaf is loaded to the L3 lookup tree in function block 303. This may be a 1 bit flag, with 0=OFF and 1=ON. ON means do L4 classification. This flag is set to ON if the rule being added to the SMT (L4 classification tree) has the same Destination Address (DA) pattern as the leaf in the L3 lookup tree. An example is a DA of 1. 1. 1.*.

Figure 3B:
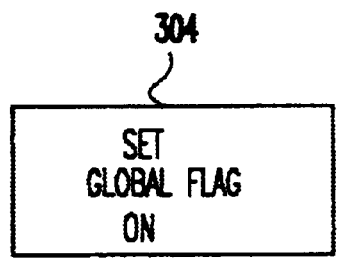
FIG. 3B is a flowchart showing the procedure for a second new flag, called the Global Flag, according to the invention.

FIG. 3B illustrates the setting of the Global Flag. The Global Flag is set in memory in function block 304. This may be a 1 bit flag, with 0=OFF and 1=ON. ON means do L4 classification. This flag is set ON any time a new rule is added to the L4 classification tree that can not be correlated to a single leaf in the L3 lookup tree.

When both these flags are used in the second embodiment, a restriction applies that both flags can not be set to ON for the addition of any given L4 rule.

Figure 4:
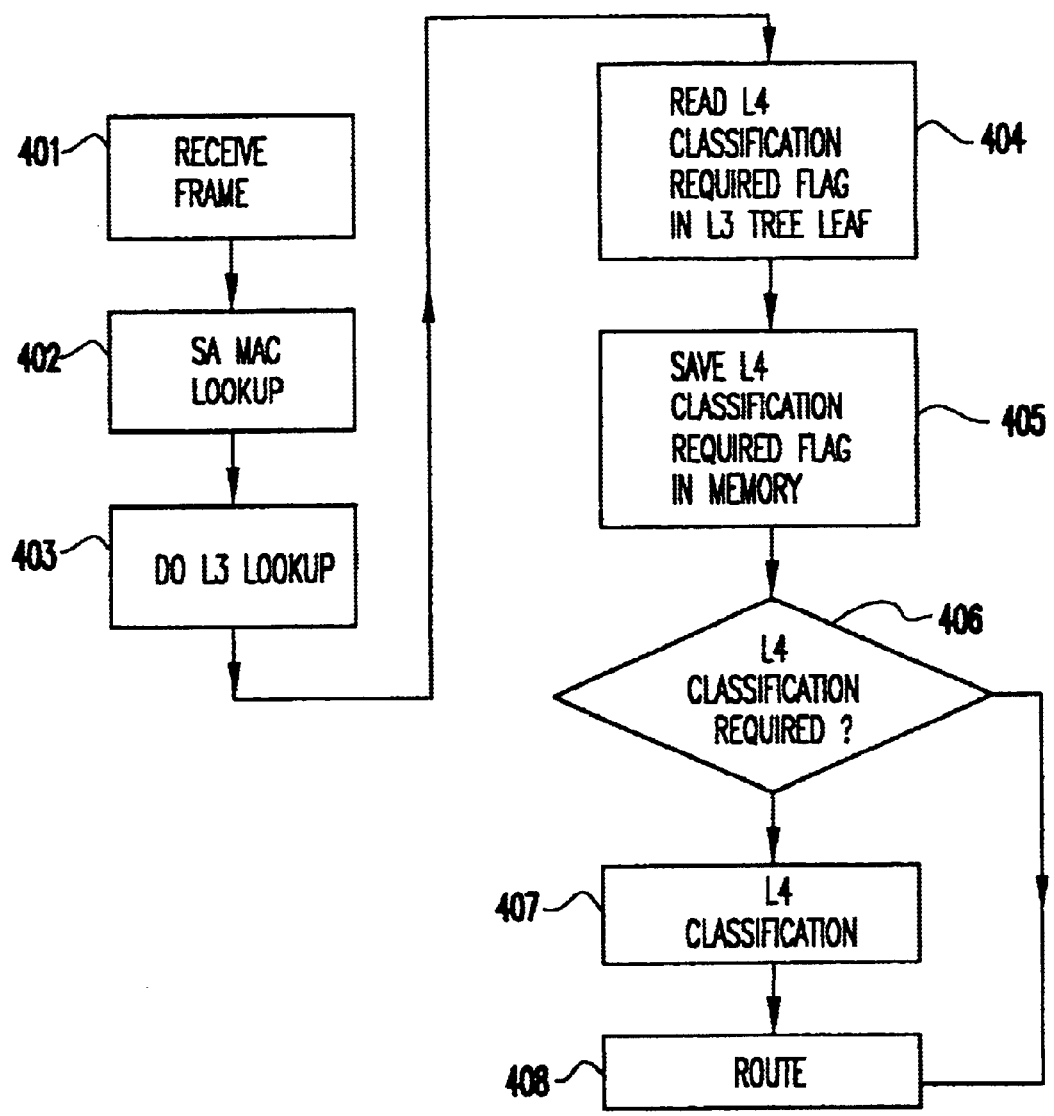
FIG. 4 is a flowchart showing the basic logic of the procedure according to the invention.

FIG. 4 is a flowchart of the basic flow of the invention. A frame received in function block 401 for routing is first processed by the SA MAC lookup code in function block 402. Then an L3 lookup is done in function block 403 and the Classification Required Flag read in function block 404. The value of the Classification Required Flag is saved in memory in function block 405. Next, a determination is made in decision block 406 as to whether a L4 Lookup is required. How this done depends upon the particular embodiment of the invention and is described and illustrated in FIGS. 5 and 6 below. Finally, either an L4 classification in function block 407 followed by routing in function block 408 or just routing is performed.

Figure 5:
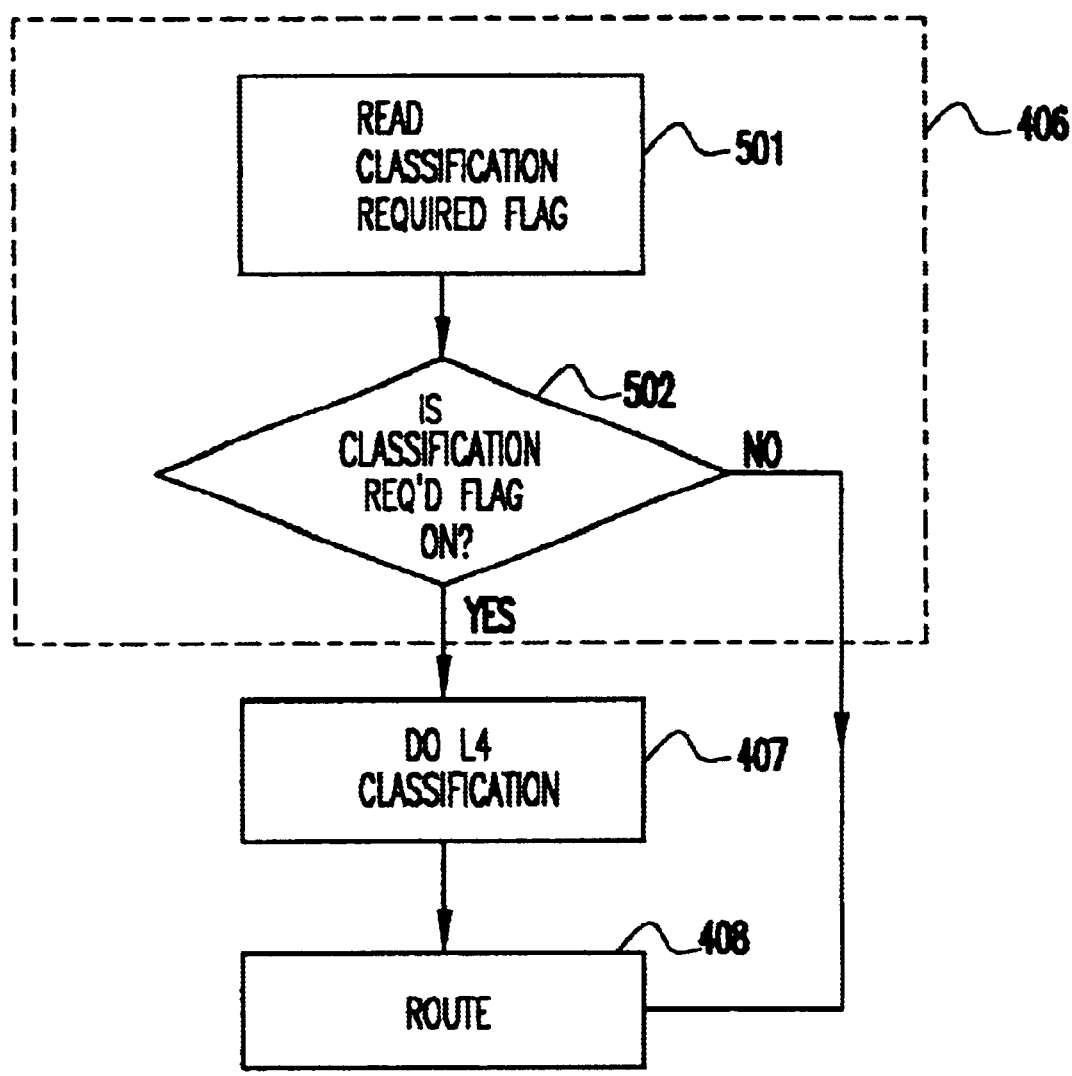
FIG. 5 is a flowchart, expanding on the flowchart of FIG. 4, showing a first embodiment of the invention.
Figure 6:
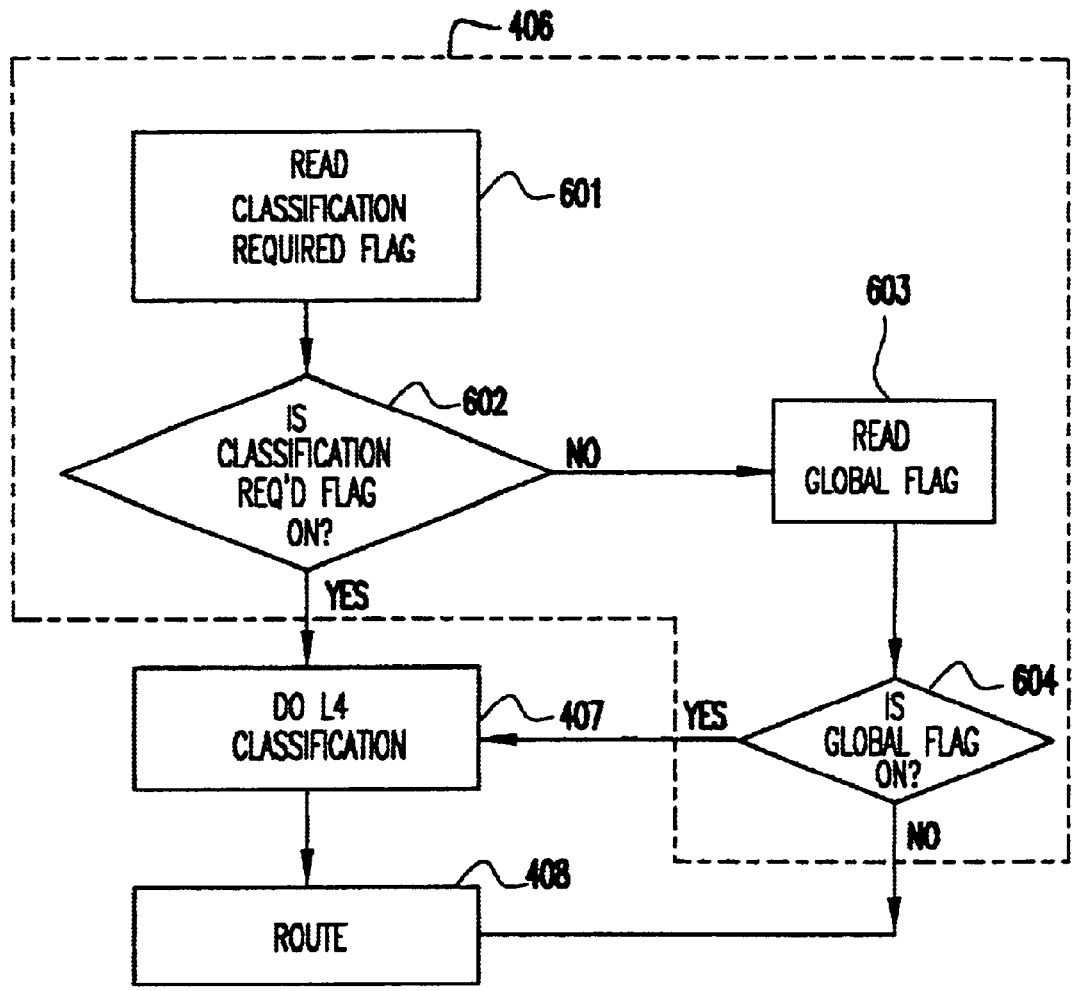
FIG. 6 is a flowchart, expanding on the flowchart of FIG. 4, showing a second embodiment of the invention.

The decision block 406 in FIG. 4 is expanded in FIGS. 5 and 6 and indicated by dashed lines in those two figures. Referring first to FIG. 5, the flow for the first embodiment when only the L4 Classification Required Flag is used. In this flow, the L4 Classification Flag is read in function block 501, and if it is OFF, as determined in decision block 502, the frame is routed in function block 408. If it is ON, then L4 classification is done in function block 407 before the frame is routed.

The code for the first embodiment is as follows:

if classification_req=ON/*from layer 3*/do L4 classification

FIG. 6 illustrates the flow for the second embodiment of the invention when both the L4 Classification Required Flag and the Global Flag are used. In this flow, the L4 Classification Required Flag is read in function block 601, and if the L4 Classification Required Flag is ON, as determined in decision block 602, the frame is L4 classified in function block 407 and then routed in function block 408. If it is OFF, then the Global Flag is read in function block 603. If the Global Flag is ON, as determined in decision block 604, then layer 4 classification is done in function block 407 followed by routing in function block 408. If the Global Flag is OFF, then the frame is routed.

The code for the second embodiment is as follows:

if classification_req=ON/*from layer 3*/do L4 classification else if global_flag=ON/*from memory*/do L4 classification While the invention has been described in terms of two preferred embodiments, those skilled in the art will recognize that the invention can be practiced with modification within the spirit and scope of the appended claims.

Having thus described our invention, what we claim as new and desire to secure by letters patent is as follows:

1. A method of routing a data packet comprising the steps of:

inserting into a set of Layer 3 (L3) rules in L3 lookup structure a set of Layer 4 (L4) Classification Required Flags;

selecting which rule to apply to a data packet and reading the state of the corresponding L4 Classification Required Flag; and in response to a first state of said corresponding L4 Classification Required Flag, performing a L4 classification followed by a routing of the data packet, and in response to a second state of said corresponding L4 Classification Required Flag, performing a routing of the data packet.

2. The method of claim 1, wherein said state of said L4 Classification Required Flag is set by comparing the L4 classification rule to an Internet Protocol (IP) lookup rule.

3. A method of routing a data packet comprising the steps of:

inserting into a set of Layer 3 (L3) rules in L3 lookup structure a set of Layer 4 (L4) Classification Required Flags;

setting a Global Flag in memory when a new rule is added to a L4 classification tree that cannot be correlated to a single leaf in a L3 lookup tree in said L3 lookup structure;

selecting which rule to apply to said a packet and reading the state of the corresponding L4 Classification Required Flag;

in response to a first state of said corresponding L4 Classification Required Flag, performing an L4 classification followed by a routing of the data packet;

in response to a second state of said corresponding L4 classification flag, reading the state of the Global Flag;

in response to a first state of said Global Flag performing an L4 classification followed by a routing of the data packet; and in response to a second state of said Global Flag, performing a routing of the data packet.

4. The method of claim 3, wherein said first state of said L4 Classification Required Flag is set when a new rule is added to L4 classification structure, said new rule being correlatable to a single entry in L3 lookup structure.

* * * * *